United States Patent
Wu

(10) Patent No.: US 11,781,876 B2
(45) Date of Patent: Oct. 10, 2023

(54) METHOD AND APPARATUS FOR GENERATING VEHICLE NAVIGATION PATH

(71) Applicant: APOLLO INTELLIGENT CONNECTIVITY (BEIJING) TECHNOLOGY CO., LTD., Beijing (CN)

(72) Inventor: Junfa Wu, Beijing (CN)

(73) Assignee: Apollo Intelligent Connectivity (Beijing) Technology Co., LTD., Beijing (CN)

( * ) Notice: Subject to any disclaimer, the term of this patent is extended or adjusted under 35 U.S.C. 154(b) by 0 days.

(21) Appl. No.: 17/828,308

(22) Filed: May 31, 2022

(65) Prior Publication Data
US 2022/0291001 A1    Sep. 15, 2022

(30) Foreign Application Priority Data
May 31, 2021  (CN) .......................... 202110601418.8

(51) Int. Cl.
G01C 21/34    (2006.01)

(52) U.S. Cl.
CPC ................ G01C 21/3461 (2013.01)

(58) Field of Classification Search
CPC ................................................. G01C 21/34
See application file for complete search history.

(56) References Cited

U.S. PATENT DOCUMENTS

| | | | |
|---|---|---|---|
| 2006/0184316 A1* | 8/2006 | Hultin | G08G 1/096844 701/532 |
| 2010/0332119 A1 | 12/2010 | Geelen et al. | |
| 2011/0087429 A1* | 4/2011 | Trum | G01C 21/3697 701/533 |
| 2013/0218453 A1* | 8/2013 | Geelen | G01C 21/3626 701/410 |

(Continued)

FOREIGN PATENT DOCUMENTS

| | | |
|---|---|---|
| CN | 101964941 A | 2/2011 |
| CN | 103278168 A | 9/2013 |

(Continued)

OTHER PUBLICATIONS

Office Action for Japanese Application No. 2022-054750, dated Apr. 18, 2023, 15 pages.

(Continued)

*Primary Examiner* — Dale Moyer
(74) *Attorney, Agent, or Firm* — Lippes Mathias LLP

(57) ABSTRACT

A method and an apparatus for generating a vehicle navigation path includes: acquiring attribute information and trajectory information of a vehicle; generating yaw information of a vehicle based on current road network information of a road network and the trajectory information of the vehicle; acquiring a confidence level of limit information of a road section in the road network within a current time period; and updating the confidence level of limit information of the road section in the road network within the current time period based on the attribute information and the yaw information of the vehicle, and generating a navigation path of the vehicle based on the updated confidence level of limit information.

20 Claims, 2 Drawing Sheets

(56) References Cited

U.S. PATENT DOCUMENTS

2014/0303886 A1* 10/2014 Roemersperger .. G01C 21/3697
701/411

FOREIGN PATENT DOCUMENTS

| | | | |
|---|---|---|---|
| CN | 111679302 | A | 9/2020 |
| EP | 2387696 | B1 | 5/2016 |
| JP | H116741 | A | 1/1999 |
| JP | H11154299 | A | 6/1999 |
| JP | 2005284588 | A | 10/2005 |
| JP | 2006275647 | A | 10/2006 |
| JP | 2010127946 | A | 6/2010 |
| JP | 2012063881 | A | 3/2012 |
| JP | 2020160929 | A | 10/2020 |

OTHER PUBLICATIONS

Search Report for European Application No. 22176334.5, dated Nov. 3, 2022, 9 pages.
Office Action for Chinese Application No. 202110601418.8, dated Aug. 17, 2023, 27 pages.

* cited by examiner

METHOD AND APPARATUS FOR GENERATING VEHICLE NAVIGATION PATH

CROSS REFERENCE TO RELATED APPLICATION

This application claims the benefit of priority to Chinese patent application No. 202110601418.8, filed on May 31, 2021, the entire disclosure of which is incorporated herein by reference for all purposes.

FIELD

The disclosure relates to a field of data processing technologies, specifically to a field of intelligent transportation, and particularly to a method and an apparatus for generating a vehicle navigation path.

BACKGROUND

With rapid development of logistics industry, it is particularly important for a vehicle to acquire accurate and prompt navigation information. Navigation information generally relies on field data acquisition.

SUMMARY

The disclosure provides a method and an apparatus for generating a vehicle navigation path.

According to a first aspect of the disclosure, a method for generating a vehicle navigation path is provided, and includes: acquiring attribute information and trajectory information of a vehicle; generating yaw information of a vehicle based on current road network information of a road network and the trajectory information of the vehicle; acquiring a confidence level of limit information of a road section in the road network within a current time period; and updating the confidence level of limit information of the road section in the road network within the current time period based on the attribute information and the yaw information of the vehicle, and generating a navigation path of the vehicle based on the updated confidence level of limit information.

According to a second aspect of the disclosure, an apparatus for generating a vehicle navigation path is provided, and includes: at least one processor; and a memory communicatively connected to the at least one processor; the memory is stored with instructions executable by the at least one processor, the instructions are performed by the at least one processor, to cause the at least one processor to perform: acquiring attribute information and trajectory information of a vehicle; generating yaw information of a vehicle based on current road network information of a road network and the trajectory information of the vehicle; acquiring a confidence level of limit information of a road section in the road network within a current time period; and updating the confidence level of limit information of the road section in the road network within the current time period based on the attribute information and the yaw information of the vehicle, and generating a navigation path of the vehicle based on the updated confidence level of limit information.

According to a third aspect of the disclosure, a non-transitory computer readable storage medium stored with computer instructions is provided. The computer instructions are configured to cause a computer to implement: acquiring attribute information and trajectory information of a vehicle; generating yaw information of a vehicle based on current road network information of a road network and the trajectory information of the vehicle; acquiring a confidence level of limit information of a road section in the road network within a current time period; and updating the confidence level of limit information of the road section in the road network within the current time period based on the attribute information and the yaw information of the vehicle, and generating a navigation path of the vehicle based on the updated confidence level of limit information.

It should be understood that the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

In existing vehicle navigation, in order to provide reasonable navigation, it is required to acquire vehicle attribute information and road limit information, so as to avoid the vehicle entering a road section with a height limit lower than a height of the vehicle. Channels for acquiring vehicle data are relatively few, and data such as vehicle height, vehicle width and vehicle weight, and information of height limit and width limit of a road during each time period is generally acquired by a field team. However, due to limited members of the field team, attribute information of the vehicle and limit information of the road are updated slowly, having a low frequency, and the latest limit information of the road cannot be provided timely, and further accuracy and rationality of vehicle navigation are poor.

In order to solve the problem of difficult to acquiring the vehicle navigation information, the present disclosure provides a method and an apparatus for generating a vehicle navigation path, and an electronic device. The method and the apparatus for generating the vehicle navigation path, and the electronic device acquire vehicle information based on a User Generated Content (UGC) trajectory. Drivers are encouraged to set a vehicle model based on an incentive mechanism, to introduce a confidence level of road network information for a vehicle, and provide a solution for extracting the road network information fast and accurately. In addition, core points of interest (POI) such as vehicle parking spots and gas stations may also be extracted based on the method, which may give drivers a better navigation experience.

At the same time, vehicle driving clout for different road sections during different time periods are evaluated, which facilitate drivers to drive and prompts vehicles of other vehicle models to avoid heavy vehicles, so as to improve the driving experience of ordinary users.

Figure 1:
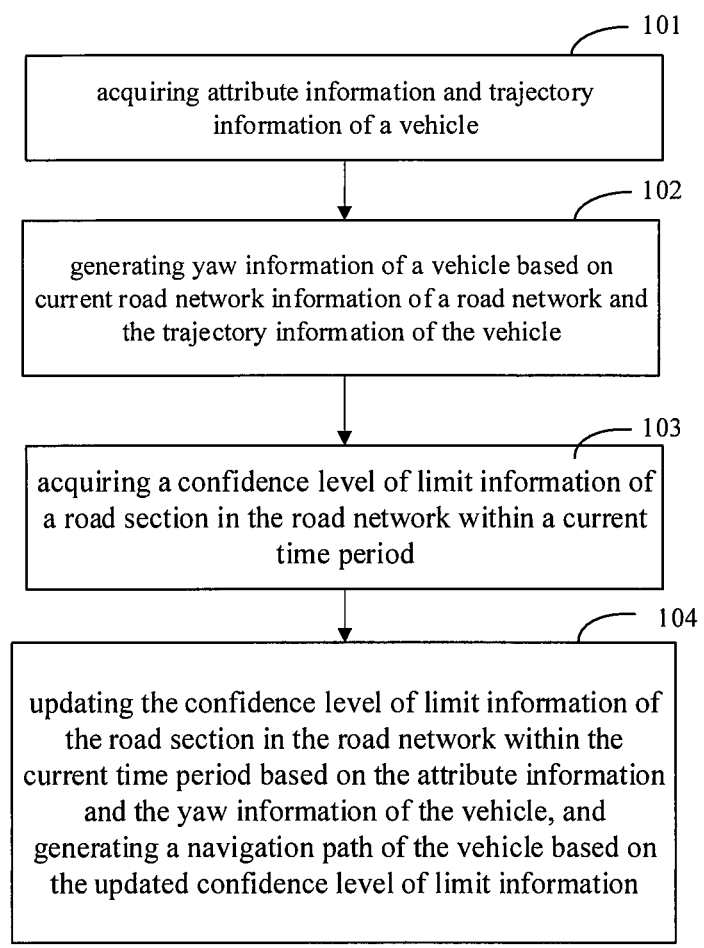
FIG. 1 is a flowchart illustrating a method for generating a vehicle navigation path according to an embodiment of the present disclosure.

FIG. 1 is a flowchart illustrating a method for generating a vehicle navigation path according to an embodiment of the present disclosure. As illustrated in FIG. 1, the method for generating the vehicle navigation path provided in the disclosure includes the following blocks.

At block 101, attribute information and trajectory information of a vehicle are acquired.

At block 102, yaw information of a vehicle is generated based on current road network information of a road network and the trajectory information of the vehicle.

At block 103, a confidence level of limit information of a road section in the road network within a current time period is acquired.

At block 104, the confidence level of limit information of the road section in the road network within the current time period is updated based on the attribute information and the yaw information of the vehicle, and a navigation path of the vehicle is generated based on the updated confidence level of limit information.

The attribute information of the vehicle includes at least one of vehicle height, vehicle width, vehicle weight, or vehicle model information. The vehicle model information includes a mini-freight vehicle, a light freight vehicle, and a medium and heavy freight vehicle.

In an example, the vehicle model information further includes a model for a dangerous goods transport vehicle.

In a possible implementation, a driver may freely select whether to upload the trajectory information and the attribute information of the vehicle.

In an example, acquiring the confidence level of limit information of the road section in the road network within the current time period includes: updating the confidence level of limit information based on the number of the confidence levels of limit information and an upper limit value of the number of confidence levels corresponding to the road section within a current time period, the upper limit value of the number of confidence levels is an upper limit value of the number of confidence levels of limit information of the corresponding road section within the current time period.

A maximum value of the number of the confidence levels of height and width limits in a certain road section during a certain time period may be N. N is the upper limit value of the number of the confidence levels. Different confidence levels correspond to different height and width limits. Whether there are N confidence levels of height and width limits of the current road section within the current time period is determined. In a case that the number of the confidence levels of height and width limits less than N, one confidence level is created with a new height and width limit, and the new height and width limit is added to an alternative height and width limit of the road section. In a case that the number of the confidence levels of height and width limits is equal to N, a height and width limit with a lowest confidence level is removed, and the new height and width limit is added to the alternative height and width limit of the road section.

In an example, the method further includes: triggering reward and withdrawal to give a vehicle driver reward based on the attribute information and the trajectory information uploaded by a vehicle driver.

In an embodiment of the present disclosure, updating the confidence level of limit information includes: in response to the number of the confidence levels of limit information corresponding to the road section within the current time period being less than the upper limit value of the number of the confidence levels, adding new limit information to the road section within the current time period, and creating the confidence level of the new limit information.

In an embodiment of the present disclosure, updating the confidence level of limit information includes: in response to the number of the confidence levels of limit information corresponding to the road section within the current time period being equal to the upper limit value of the number of the confidence levels, removing limit information with a lowest confidence level corresponding to the road section within the current time period, adding new limit information to the road section within the current time period, and creating the confidence level of the new limit information.

In an embodiment of the present disclosure, updating the confidence level of limit information of the road section in the road network within the current time period based on the attribute information and the yaw information of the vehicle includes: updating the confidence level of the limit information based on the limit information of the road section within the current time period and the attribute information of the vehicle passing through the road section.

In an embodiment of the present disclosure, updating the confidence level of the limit information includes: in response to the attribute information of the vehicle passing through the road section within the current time period being greater than highest limit information of the road section, removing limit information with a lowest confidence level corresponding to the road section within the current time period, creating new limit information corresponding to the road section within the current time period based on the attribute information corresponding to the vehicle, and creating the confidence level of the new limit information.

In an embodiment of the present disclosure, updating the confidence level of the limit information includes: in response to the attribute information of the vehicle passing through the road section within the current time period being less than or equal to highest limit information of the corresponding road section, updating the confidence level of the limit information based on the limit information and the attribute information of the vehicle.

In an embodiment of the present disclosure, updating the confidence level of the limit information based on a relationship between the limit information and the attribute information of the vehicle includes: reducing the confidence level of the limit information in response to the limit information being less than the attribute information of the vehicle.

In an embodiment of the present disclosure, updating the confidence level of the limit information based on the relationship between the limit information and the attribute information of the vehicle includes: increasing the confidence level of the limit information in response to the limit information being greater than or equal to the attribute information of the vehicle.

When the vehicle attribute information uploaded based on the UGC trajectory conforms to an original height and weight limit of the current road section, a confidence level of the original height and weight limit of the road section is increased. When the vehicle attribute information uploaded based on the UGC trajectory exceeds the original height and weight limit of the current road section, a new height and weight limit is created, and a confidence level of the new height limit and weight limit is calculated, and confidence levels of other height and weight limits are updated based on the vehicle attribute information. Specifically, the method includes the following.

There are several height limit and width limit information Ln in a certain road section within one time period.

A driving trajectory of a freight vehicle on the current road section within the time period is parsed from the trajectory information of the vehicle.

When the height and width information Lvehicle of the current vehicle is higher than the maximum value Lmax of the height limit and width limit information of the current road section, a new confidence level of height and width limit is created. And confidence levels of all Lns in the current road section are reduced.

When Lvehicle of the current vehicle is lower than Lmax of the current road section, for any Ln higher than or equal to Lvehicle, the confidence level is increased; for any Ln lower than Lvehicle, the confidence level is reduced.

In an embodiment of the present disclosure, the method further includes: updating the confidence level of the limit information based on the limit information and the attribute information of the vehicle in response to the vehicle yawing on the road section within the current time period.

The term "yaw" may refer to a behavior of deviating from a navigation route due to driving not based on the route in a navigation process. Information recorded when the yaw is triggered by the user is the yaw information. The yaw information may include original navigation route information, new navigation route information, yaw time, and vehicle information. Such information is configured to update vehicle route data timely after aggregated on a server.

When the vehicle height meets the height limit of the current road section, but the vehicle is in yaw, it is likely that the height and width limit of the road section does not meet the height and width limit requirements of the freight vehicle, the confidence level of any Ln higher than Lvehicle in the road section is reduced.

In an embodiment of the present disclosure, updating the confidence level of the limit information based on the limit information and the attribute information of the vehicle includes: reducing the confidence level of the limit information in response to the limit information being greater than or equal to the attribute information of the vehicle.

In an embodiment of the present disclosure, the method further includes: in response to limit information with a highest confidence level in the limit information corresponding to the road section within the current time period being updated, sending the limit information of the road section within the current time period to a review terminal, and receiving a review confidence level of limit information fed back by the review terminal, and replacing the confidence level of limit information corresponding to the road section within the current time period with the review confidence level of limit information in response to updating the limit information with the highest confidence level in the limit information corresponding to the road section within the current time period.

In a possible implementation, when the original height limit and width limit information with the highest confidence level corresponding to a certain road section within a certain time period varies, a manual review module is triggered to manually review a confidence level of a manual review based on the manual review. After the manual review is completed, the height and width limit information of the road section within the time period is reset, and data is stored in road network information of the freight vehicle. The height and width limit information obtained by the manual review is relatively reliable, therefore, the confidence level of the height and width limit information obtained by the manual review is extremely high.

Optionally, the method may further include: vehicles driving clout in each road section within different time periods are calculated to remind non-freight vehicles to drive. In daily driving, some vehicles may have certain potential safety hazards for other vehicles such as cars due to the large load of some vehicles. Therefore, by calculating the driving clout of trucks, a route planning may cause non-freight vehicles to avoid the freight vehicles, which may improve the driving safety. When it is impossible to avoid the freight vehicles, the driving clout information is issued by the server, to remind the driver by a speech "the front road section is a road section that a large truck often drives, please drive carefully".

Optionally, the method may further include: extracting a parking spot of a vehicle driver, extracting high-frequency POI information of the vehicle by aggregating on the server based on a POI check service for recommendation of parking spots during driving.

Optionally, the method may further include: determining whether the driver is fatigue driving based on continuity of the trajectory, and reminding the driver being fatigue driving to have a rest in a service area.

The confidence level of limit information of the road network within the current time period is updated based on the attribute information and the trajectory information uploaded by the vehicle, capable of acquiring real-time vehicle navigation information, with a high updating frequency and good timeliness. Therefore, precision of the navigation path is enhanced, which facilitates a vehicle driver to avoid driving during peak hours better and improve travel efficiency.

Figure 2:
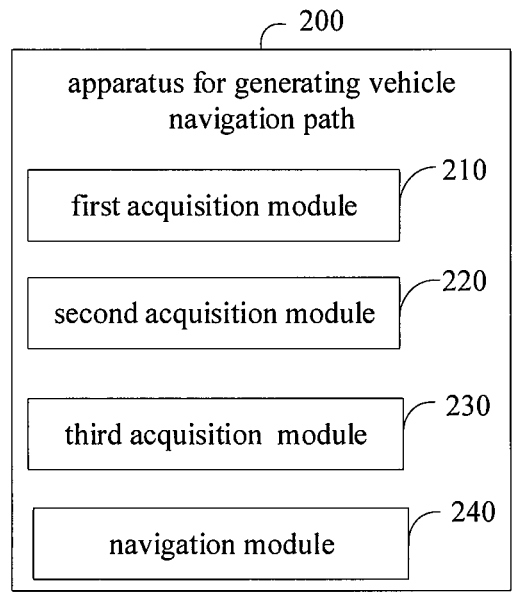
FIG. 2 is a block diagram illustrating an apparatus for generating a vehicle navigation path according to an embodiment of the present disclosure.

FIG. 2 is a block diagram illustrating an apparatus 200 for generating a vehicle navigation path according to an embodiment of the present disclosure. As illustrated in FIG. 2, the apparatus for generating the vehicle navigation path provided in the disclosure includes: a first acquisition module 210, a second acquisition module 220, a third acquisition module 230 and a navigation module 240.

The first acquisition module 210 is configured to acquire attribute information and trajectory information of a vehicle. The second acquisition module 220 is configured to generate yaw information of a vehicle based on current road network information of a road network and the trajectory information of the vehicle. The third acquisition module 230 is configured to acquire a confidence level of limit information of a road section in the road network within a current time period. The navigation module 240 is configured to update the confidence level of limit information of the road section in the road network within the current time period based on the attribute information and the yaw information of the vehicle, and generate a navigation path of the vehicle based on the updated confidence level of limit information.

Optionally, the third acquisition module includes: a first updating submodule, configured to update the confidence level of limit information based on the number of the confidence levels of limit information corresponding to the road section within the current time period and the upper limit value of the number of confidence levels. The upper limit value of the number of confidence levels is an upper limit value of the number of confidence levels of limit information of the corresponding road section within the current time period.

Optionally, the first updating submodule includes: a first level updating unit, configured to, in response to the number of the confidence levels of limit information corresponding to the road section within the current time period being less than the upper limit value of the number of the confidence levels, add new limit information to the road section within the current time period, and create the confidence level of the new limit information.

Optionally, the first updating submodule includes: a second confidence level updating unit, configured to, in response to the number of the confidence levels of limit information corresponding to the road section within the current time period being equal to the upper limit value of the number of the confidence levels, remove limit information with a lowest confidence level corresponding to the road section within a current time period, add new limit information to the road section within the current time period, and create the confidence level of the new limit information.

Optionally, the navigation module includes: a second updating submodule, configured to update the confidence level of the limit information based on the limit information of the road section within the current time period and the attribute information of the vehicle passing through the road section.

Optionally, the second updating submodule includes: a third updating unit, configured to, in response to the attribute information of the vehicle passing through the road section within the current time period being greater than highest limit information of the road section, remove limit information with a lowest confidence level corresponding to the road section within the current time period, create new limit information corresponding to the road section within the current time period based on the attribute information corresponding to the vehicle, and create the confidence level of the new limit information.

Optionally, the second updating submodule includes: a fourth updating unit, configured to, in response to the attribute information of the vehicle passing through the road section within the current time period being less than or equal to highest limit information of the corresponding road section, update the confidence level of the limit information based on the limit information and the attribute information of the vehicle.

Optionally, the fourth updating unit includes: a first updating subunit, configured to reduce the confidence level of the limit information in response to the limit information being less than the attribute information of the vehicle.

Optionally, the fourth updating unit, includes: a second updating subunit, configured to increase the confidence level of the limit information in response to the limit information being greater than or equal to the attribute information of the vehicle.

Optionally, the apparatus further includes: a first updating module, configured to update the confidence level of the limit information based on the limit information and the attribute information of the vehicle in response to the vehicle yawing on the road section within the current time period.

Optionally, the first updating module includes: a third updating submodule, configured to reduce the confidence level of the limit information in response to the limit information being greater than or equal to the attribute information of the vehicle.

Optionally, the apparatus further includes: a second updating module, configured to, in response to limit information with a highest confidence level in the limit information corresponding to the road section within the current time period being updated, send the limit information of the road section within the current time period to a review terminal, receive a review confidence level of limit information fed back by the review terminal, and replace the confidence level of limit information corresponding to the road section within the current time period with the review confidence level of limit information.

The confidence level of limit information of the road network within the current time period is updated based on the attribute information and the trajectory information uploaded by the vehicle, capable of acquiring real-time vehicle navigation information, with a high updating frequency and good timeliness. Therefore, precision of the navigation path is enhanced, which facilitates a vehicle driver to avoid driving during peak hours better and improve travel efficiency.

According to the embodiment of the present disclosure, the present disclosure further provides an electronic device, a readable storage medium and a computer program product.

Figure 3:
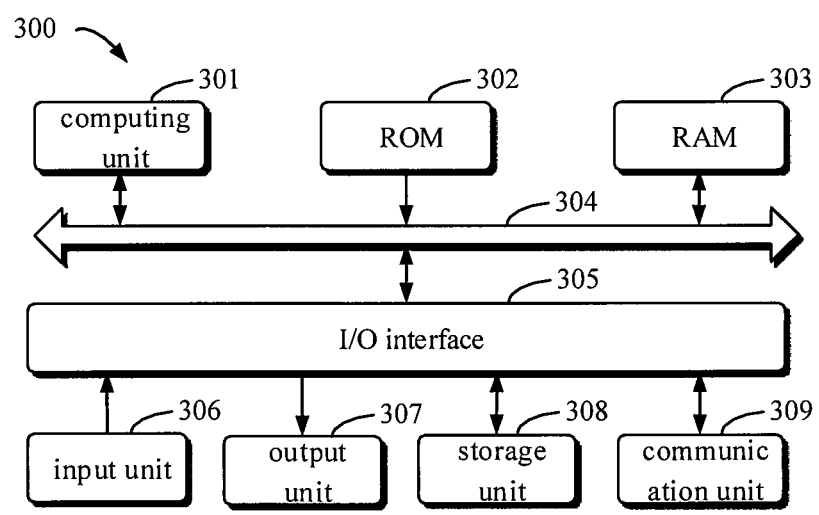
FIG. 3 is a block diagram illustrating an electronic device for implementing a method for generating a vehicle navigation path according to an embodiment of the present disclosure.

FIG. 3 illustrates a block diagram of an electronic device 300 for implementing a method for generating a vehicle navigation path according to an embodiment of the present disclosure. The electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 3, a device 300 includes a computing unit 301, configured to execute various appropriate actions and processes according to a computer program stored in a read-only memory (ROM) 302 or loaded from a storage unit 308 to a random access memory (RAM) 303. In a RAM 303, various programs and data required by an operation of a device 300 may be further stored. A computing unit 301, a ROM 302 and a RAM 303 may be connected with each other by a bus 304. An input/output (I/O) interface 305 is also connected to a bus 304.

A plurality of components in the device 300 are connected to an I/O interface 305, and includes: an input unit 306, for example, a keyboard, a mouse, etc.; an output unit 307, for example various types of displays, speakers; a storage unit 308, for example a magnetic disk, an optical disk; and a communication unit 309, for example, a network card, a modem, a wireless transceiver. The communication unit 309 allows a device 300 to exchange information/data through a computer network such as internet and/or various types of telecommunication networks and other devices.

The computing unit 301 may be various types of general and/or dedicated processing components with processing and computing ability. Some examples of a computing unit 301 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 301 performs various methods and processings as described above, for example, a method for generating a vehicle navigation path. For example, in some embodiments, the method for generating a vehicle navigation path may be further achieved as a computer software program, which is physically contained in a machine readable medium, such as a storage unit 308. In some embodiments, a part or all of the computer program may be loaded and/or installed on the device 300 via a ROM 302 and/or a communication unit 309. When the computer program is loaded on a RAM 303 and performed by a computing unit 301, one or more blocks in the above method for generating a vehicle navigation path may be performed. Alternatively, in other embodiments, a computing unit 301 may be configured to perform a method for generating a vehicle navigation path in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the disclosure may be executed in parallel, sequentially, or in different orders, as long as the desired result of the technical solution disclosed in the present disclosure may be achieved, which will not be limited herein.

The foregoing specific embodiments do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

The invention claimed is:

1. A method for generating a vehicle navigation path, comprising:
   acquiring attribute information and trajectory information of a vehicle;
   generating yaw information of a vehicle based on current road network information of a road network and the trajectory information of the vehicle;
   acquiring a confidence level of limit information of a road section in the road network within a current time period; and
   updating the confidence level of limit information of the road section in the road network within the current time period based on the attribute information and the yaw information of the vehicle, and generating a navigation path of the vehicle based on the updated confidence level of limit information.

2. The method of claim 1, wherein acquiring the confidence level of limit information of the road section in the road network within the current time period comprising:
   updating the confidence level of limit information based on the number of the confidence levels of limit information corresponding to the road section within the current time period and an upper limit value of the number of the confidence levels, wherein, the upper limit value of the number of confidence levels is an upper limit value of the number of confidence levels of limit information of the corresponding road section within the current time period.

3. The method of claim 2, wherein updating the confidence level of limit information comprising:
   in response to the number of the confidence levels of limit information corresponding to the road section within the current time period being less than the upper limit value of the number of the confidence levels, adding new limit information to the road section within the current time period, and creating the confidence level of the new limit information.

4. The method of claim 2, wherein updating the confidence level of limit information comprising:
   in response to the number of the confidence levels of limit information corresponding to the road section within the current time period being equal to the upper limit value of the number of the confidence levels, removing limit information with a lowest confidence level corresponding to the road section within the current time period, adding new limit information to the road section within the current time period, and creating the confidence level of the new limit information.

5. The method of claim 1, wherein updating the confidence level of limit information of the road section in the road network within the current time period based on the attribute information and the yaw information of the vehicle comprising:
   updating the confidence level of the limit information based on the limit information of the road section within the current time period and the attribute information of the vehicle passing through the road section.

6. The method of claim 5, wherein updating the confidence level of the limit information comprising:
   in response to the attribute information of the vehicle passing through the road section within the current time period being greater than highest limit information of the road section, removing limit information with a lowest confidence level corresponding to the road section within the current time period, creating new limit information corresponding to the road section within the current time period based on the attribute information corresponding to the vehicle, and creating the confidence level of the new limit information.

7. The method of claim 5, wherein updating the confidence level of the limit information comprising:
   in response to the attribute information of the vehicle passing through the road section within the current time period being less than or equal to highest limit information of the corresponding road section, updating the confidence level of the limit information based on the limit information and the attribute information of the vehicle.

8. The method of claim 7, wherein updating the confidence level of the limit information based on a relationship between the limit information and the attribute information of the vehicle comprising:
   reducing the confidence level of the limit information in response to the limit information being less than the attribute information of the vehicle.

9. The method of claim 7, wherein updating the confidence level of the limit information based on a relationship between the limit information and the attribute information of the vehicle comprising:
   increasing the confidence level of the limit information in response to the limit information being greater than or equal to the attribute information of the vehicle.

10. The method of claim 1, further comprising:
    updating the confidence level of the limit information based on the limit information and the attribute information of the vehicle in response to the vehicle yawing on the road section within the current time period.

11. The method of claim 10, wherein updating the confidence level of the limit information based on the limit information and the attribute information of the vehicle comprising:
    reducing the confidence level of the limit information in response to the limit information being greater than or equal to the attribute information of the vehicle.

12. The method of claim 1, further comprising:
    in response to limit information with a highest confidence level in the limit information corresponding to the road section within the current time period being updated, sending the limit information of the road section within the current time period to a review terminal, and receiving a review confidence level of limit information fed back by the review terminal, and replacing the confidence level of limit information corresponding to the road section within the current time period with the review confidence level of limit information.

13. An apparatus for generating a vehicle navigation path, comprising:
    at least one processor; and
    a memory communicatively connected to the at least one processor; wherein,
    the memory is stored with instructions executable by the at least one processor, the instructions are performed by the at least one processor, to cause the at least one processor to perform:
    acquiring attribute information and trajectory information of a vehicle;
    generating yaw information of a vehicle based on current road network information of a road network and the trajectory information of the vehicle;
    acquiring a confidence level of limit information of a road section in the road network within a current time period; and updating the confidence level of limit information of the road section in the road network within the current time period based on the attribute information and the yaw information of the vehicle, and generating a navigation path of the vehicle based on the updated confidence level of limit information.

14. The apparatus of claim 13, wherein the at least one processor is configured to:
update the confidence level of limit information based on the number of the confidence levels of limit information corresponding to the road section within the current time period and the upper limit value of the number of confidence levels, wherein, the upper limit value of the number of confidence levels is an upper limit value of the number of confidence levels of limit information of the corresponding road section within the current time period.

15. The apparatus of claim 14, wherein the at least one processor is configured to:
in response to the number of the confidence levels of limit information corresponding to the road section within the current time period being less than the upper limit value of the number of the confidence levels, add new limit information to the road section within the current time period, and create the confidence level of the new limit information.

16. The apparatus of claim 14, wherein the at least one processor is configured to:
in response to the number of the confidence levels of limit information corresponding to the road section within the current time period being equal to the upper limit value of the number of the confidence levels, remove limit information with a lowest confidence level corresponding to the road section within a current time period, add new limit information to the road section within the current time period, and create the confidence level of the new limit information.

17. The apparatus of claim 13, wherein the at least one processor is configured to:
update the confidence level of the limit information based on the limit information of the road section within the current time period and the attribute information of the vehicle passing through the road section.

18. The apparatus of claim 13, wherein the at least one processor is configured to:
update the confidence level of the limit information based on the limit information and the attribute information of the vehicle in response to the vehicle yawing on the road section within the current time period.

19. The apparatus of claim 13, wherein the at least one processor is configured to:
in response to limit information with a highest confidence level in the limit information corresponding to the road section within the current time period being updated, send the limit information of the road section within the current time period to a review terminal, receive a review confidence level of limit information fed back by the review terminal, and replace the confidence level of limit information corresponding to the road section within the current time period with the review confidence level of limit information.

20. A non-transitory computer readable storage medium stored with computer instructions, wherein, the computer instructions are configured to cause a computer to implement:
acquiring attribute information and trajectory information of a vehicle;
generating yaw information of a vehicle based on current road network information of a road network and the trajectory information of the vehicle;
acquiring a confidence level of limit information of a road section in the road network within a current time period; and
updating the confidence level of limit information of the road section in the road network within the current time period based on the attribute information and the yaw information of the vehicle, and generating a navigation path of the vehicle based on the updated confidence level of limit information.

* * * * *